(12) United States Patent
Takeyama et al.

(10) Patent No.: US 12,199,562 B2
(45) Date of Patent: *Jan. 14, 2025

(54) SOLAR POWER GENERATION SYSTEM

(71) Applicant: OMRON Corporation, Kyoto (JP)

(72) Inventors: Takahiro Takeyama, Kyoto (JP); Ryo Ogura, Kyoto (JP); Jeongho Baik, Kyoto (JP); Jun Nakaichi, Kyoto (JP); Tsuyoshi Uchida, Hoffman Estates, IL (US); Tomoko Endo, Hoffman Estates, IL (US); Erica Martin, Hoffman Estates, IL (US)

(73) Assignee: OMRON CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/106,481

(22) Filed: Feb. 7, 2023

(65) Prior Publication Data
US 2023/0268873 A1 Aug. 24, 2023

(30) Foreign Application Priority Data

Feb. 22, 2022 (JP) .................................. 2022-026166

(51) Int. Cl.
*H02S 40/36* (2014.01)
*H02J 3/38* (2006.01)
*H02M 3/335* (2006.01)
*H02S 40/32* (2014.01)

(52) U.S. Cl.
CPC .............. *H02S 40/36* (2014.12); *H02J 3/381* (2013.01); *H02M 3/335* (2013.01); *H02S 40/32* (2014.12)

(58) Field of Classification Search
CPC .......... H02S 40/36; H02S 40/32; H02J 3/381; H02M 3/335
See application file for complete search history.

(56) References Cited

U.S. PATENT DOCUMENTS

2020/0303949 A1\* 9/2020 Pauletti ............. H02J 13/00006
2022/0137657 A1\* 5/2022 Ogura ..................... H02J 3/381
307/149

FOREIGN PATENT DOCUMENTS

JP 2012-511299 A 5/2012
WO 2010/065043 A1 6/2010
WO WO-2020183700 A1 \* 9/2020 ............... G05F 1/67

\* cited by examiner

*Primary Examiner* — Tae-Sik Kang
(74) *Attorney, Agent, or Firm* — SHINJYU GLOBAL IP

(57) ABSTRACT

A solar power generation system includes a string, an inverter, a first shutoff device, and a second shutoff device. The string includes a plurality of solar cell module groups. The first shutoff device cuts off connections between the plurality of solar cell module groups connected to a first electric path, in response to a first control signal. The second shutoff device cuts off connections between the plurality of solar cell module groups connected to a second electric path, in response to a second control signal output from the first shutoff device by a communication system different from power line communication. A first switching unit of the first shutoff device includes a first open and close unit and a first semiconductor switching device connected in parallel with the first open and close unit. The first semiconductor switching device is turned ON before the first open and close unit is operated.

15 Claims, 12 Drawing Sheets

| OPERATION MODE | WEATHER/ SUNSHINE | POWER GENERATION | CONTROL SIGNAL | RELAY OPERATION MODE |
|---|---|---|---|---|
| START |  | YES | ON | ON |
| ACTIVE |  | YES | ON | ON |
| SAFETY NORMAL SHUT-OFF |  | NO | OFF | OFF |
|  |  | UNSTABLE | ON | ON/OFF |
| EMERGENCY SAFETY SHUT-OFF |  | YES | OFF | OFF |

SOLAR POWER GENERATION SYSTEM

CROSS-REFERENCES TO RELATED APPLICATIONS

This application claims priority under 35 U.S.C. § 119 to Japanese Patent Application No. 2022-026166 filed on Feb. 22, 2022. The entire disclosure of Japanese Patent Application No. 2022-026166 is hereby incorporated herein by reference.

FIELD

The present invention relates to a solar power generation system.

BACKGROUND

In the United States, for the purpose of protecting firefighters from electric shock in an emergency such as a fire, the introduction, into a solar power generation system, of a so-called rapid shutdown function that is configured to immediately stop the power generation by a solar power generation system in an emergency is mandated by National Electrical Code (NEC). For example, Published Japanese Translation No. 2012-511299 of the PCT International Publication discloses a solar power generation system in which the output of power from solar cell modules to an inverter is stopped according to the operating state of the inverter.

SUMMARY

In a solar power generation system, in order to further improve the safety of firefighters in the event of a fire, for example, preferably a shutoff device having the rapid shutdown function is installed for each solar cell module. However, the shutoff device for each solar cell module increases the installation cost of the shutoff devices.

Further, the shutoff device of a solar power generation system uses a switching device that is configured to open and close a mechanical contact such as a relay, as a switching device for cutting off an electric path in the solar power generation system. The switching device is driven by the power supplied from the solar cell modules of the solar power generation system. If the amount of power generated by the solar cell modules is smaller than that required for driving the switching device, for example, even if an attempt is made to close the contact of the switching device with the power from the solar cell modules (even if an attempt is made to turn the switching device into an ON state), the contact is opened immediately (the switching device is turned into an OFF state), and the closing and opening may be repeated. Further, when the amount of power generated by the solar cell modules becomes unstable, the switching device may be repeatedly switched between the ON state and the OFF state. The occurrence of this phenomenon makes the operation of the solar power generation system unstable.

An object of the present invention is to provide a solar power generation system that achieves both decrease in installation cost of shutoff devices and improvement of stability of the solar power generation system.

A solar power generation system according to one aspect of the present invention includes a string, an inverter, a first shutoff device, and a second shutoff device. The string includes a plurality of solar cell module groups connected in series with each other. The plurality of solar cell module groups each include one or a plurality of solar cell modules connected in series. The inverter is connected to the string and configured to convert DC power output from the string to AC power. The first shutoff device is connected to a first electric path connecting between the plurality of solar cell module groups. The second shutoff device is connected to a second electric path connecting between a plurality of solar cell module groups different from the plurality of solar cell module groups connected to the first electric path. The plurality of solar cell module groups in the string each have an open circuit voltage equal to or less than a predetermined open circuit voltage. The first shutoff device cuts off connections between the plurality of solar cell module groups connected to the first electric path, in response to a first control signal from the inverter. The second shutoff device cuts off connections between the plurality of solar cell module groups connected to the second electric path, in response to a second control signal output from the first shutoff device by a communication system different from power line communication, via a communication line connected to the first shutoff device and the second shutoff device.

The plurality of solar cell module groups in the string includes a first group. The first shutoff device is driven by power generated by one or a plurality of solar cell modules of the first group connected in series. The first shutoff device further includes a first switching unit connected to an anode side terminal of the first group. The first switching unit includes a first open and close unit and a first semiconductor switching device connected in parallel with the first open and close unit. The first semiconductor switching device is turned ON before the first open and close unit is operated.

In the solar power generation system, the first shutoff device and the second shutoff device are in a master-slave relationship, and the second shutoff device cuts off the connections between the plurality of solar cell module groups in response to a second control signal output from the first shutoff device. As such, the configuration of the second shutoff device can be simplified, reducing the installation cost of the second shutoff device. In addition, since each of the plurality of solar cell module groups has an open-circuit voltage equal to or less than a predetermined open-circuit voltage, a highly safe solar power generation system can be provided. A second control signal from the first shutoff device is output via a communication line by a communication system different from power line communication, and thereby the second control signal is unlikely to be affected by noise as compared with the power line communication, and the communication from the first shutoff device to the second shutoff device can be stabilized.

Further, in the solar power generation system, the first shutoff device includes the first switching unit, and the first switching unit includes the first open and close unit and the first semiconductor switching device connected in parallel with the first open and close unit. Furthermore, the first semiconductor switching device is turned ON before the first open and close unit is operated. In the first shutoff device driven by the power generated by the first group, the first semiconductor switching device is turned ON before the first open and close unit is operated, and thereby it is possible to reduce the occurrence of a phenomenon in which, when the amount of power generated by the first group is less than the power required for driving the first open and close unit and/or when the amount of power generated by the first group is unstable, the first open and close unit opens and closes according to the amount of power generated by the first group, and the connection and cutoff of the electric path to which an anode side terminal of the first group is connected is repeated. As a result, the operation of the solar power generation system is stabilized.

The first switching unit may include a second open and close unit connected in series with the first semiconductor switching device. In this case, the first semiconductor switching device can be reliably electrically cut off from the solar power generation system.

The first shutoff device may include a second switching unit connected to the cathode side terminal of the first group. The second switching unit may include a third open and close unit and a second semiconductor switching device connected in parallel with the third open and close unit. The second semiconductor switching device may be turned ON before the third open and close unit is operated. In this case, a plurality of electric paths can be opened and closed by the first shutoff device alone. In addition, in the second switching unit, it is possible to reduce the occurrence of a phenomenon in which, when the amount of power generated by the first group is less than that required for driving the first open and close unit and/or when the amount of power generated by the first group is unstable, the third open and close unit opens and closes according to the amount of power generated by the first group, and connection and cutoff of the electric path in connection with the cathode side terminal of the first group is repeated. As a result, the operation of the solar power generation system is stabilized.

The second switching unit may include a fourth open and close unit connected in series with the second semiconductor switching device. In this case, the second semiconductor switching device can be reliably electrically cut off from the solar power generation system.

The first switching unit and the second switching unit may be turned ON/OFF independently. In this case, for example, when a problem occurs in the first switching unit, the second switching unit in normal operation can be used to cut off the electric path.

The plurality of solar cell module groups in the string may include a second group. The second shutoff device may be driven by the power generated by one or a plurality of solar cell modules of the second group connected in series. The second shutoff device may include a third switching unit connected to an anode side terminal of the second group. The third switching unit may have a fifth open and close unit and a third semiconductor switching device connected in parallel with the fifth open and close unit. The third semiconductor switching device may be turned ON before the fifth open and close unit is operated. In this case, it is possible to reduce the occurrence of a phenomenon in which, when the amount of power generated by the second group is less than the power required for driving the fifth open and close unit and/or when the amount of power generated by the second group is unstable, the fifth open and close unit opens and closes according to the amount of power generated by the second group, and the connection and cutoff of the electric path in connection with the anode side terminal of the second group is repeated. As a result, the operation of the solar power generation system is stabilized.

The third switching unit may include a sixth open and close unit connected in series with the third semiconductor switching device. In this case, the third semiconductor switching device can be reliably electrically cut off from the solar power generation system.

The second shutoff device may include a fourth switching unit connected to a cathode side terminal of the second group. The fourth switching unit may include a seventh open and close unit and a fourth semiconductor switching device connected in parallel with the seventh open and close unit. The fourth semiconductor switching device may be turned ON before the seventh open and close unit is operated. In this case, a plurality of electric paths can be opened and closed by the second shutoff device alone. In addition, in the fourth switching unit, it is possible to reduce the occurrence of a phenomenon in which, when the amount of power generated by the second group is less than that required for driving the seventh open and close unit and/or when the amount of power generated by the second group is unstable, the seventh open and close unit opens and closes according to the amount of power generated by the second group, and the connection and cutoff of the electric path in connection with cathode side terminal of the second group is repeated. As a result, the operation of the solar power generation system is stabilized.

The fourth switching unit may include an eighth open and close unit connected in series with the fourth semiconductor switching device. In this case, the fourth semiconductor switching device can be reliably electrically cut off from the solar power generation system.

The second shutoff device may be configured such that the third switching unit and the fourth switching unit are turned ON/OFF independently of each other. In this case, for example, when a problem occurs in the third switching unit, the fourth switching unit in normal operation can be used to cut off the electric path.

The first shutoff device may transmit the second control signal to the second shutoff device after cutting off the connections between the plurality of solar cell module groups connected to the first electric path in response to the first control signal from the inverter. In this case, the voltage applied to the second shutoff device can be decreased. As a result, the cost associated with the second shutoff device can be reduced.

The open circuit voltage of the plurality of solar cell module groups in the string may be 165 V or less. In this case, a safer solar power generation system can be provided.

The inverter may output the first control signal to the first shutoff device by power line communication. In this case, when the first shutoff device is installed in an existing solar power generation system, any additional wiring for ensuring the communication between the inverter and the first shutoff device can be omitted, which reduces the installation cost of the first shutoff device.

The inverter may output the first control signal to the first shutoff device by wireless communication. In this case, the first control signal can be output to the first shutoff device by remote control.

At least one of the plurality of solar cell module groups in the string may include a plurality of solar cell modules connected in series. In this case, the plurality of solar cell modules can be cut off by the first shutoff device or the second shutoff device.

The first shutoff device may include a bypass diode connected in parallel with any one of the plurality of solar cell module groups. In this case, it is possible to decrease the heat generation and the like of the solar cell modules that became unable to generate power and to reduce a decline in the power generation efficiency of the strings.

The second shutoff device may include a bypass diode connected in parallel with any one of the plurality of solar cell module groups. In this case, it is possible to decrease the heat generation and the like of the solar cell modules that became unable to generate power and to reduce a decline in the power generation efficiency of the strings.

According to the present invention, a solar power generation system is provided that achieves both decrease in installation cost of shutoff devices and improvement of safety of the solar power generation system.

DETAILED DESCRIPTION

Figure 1:
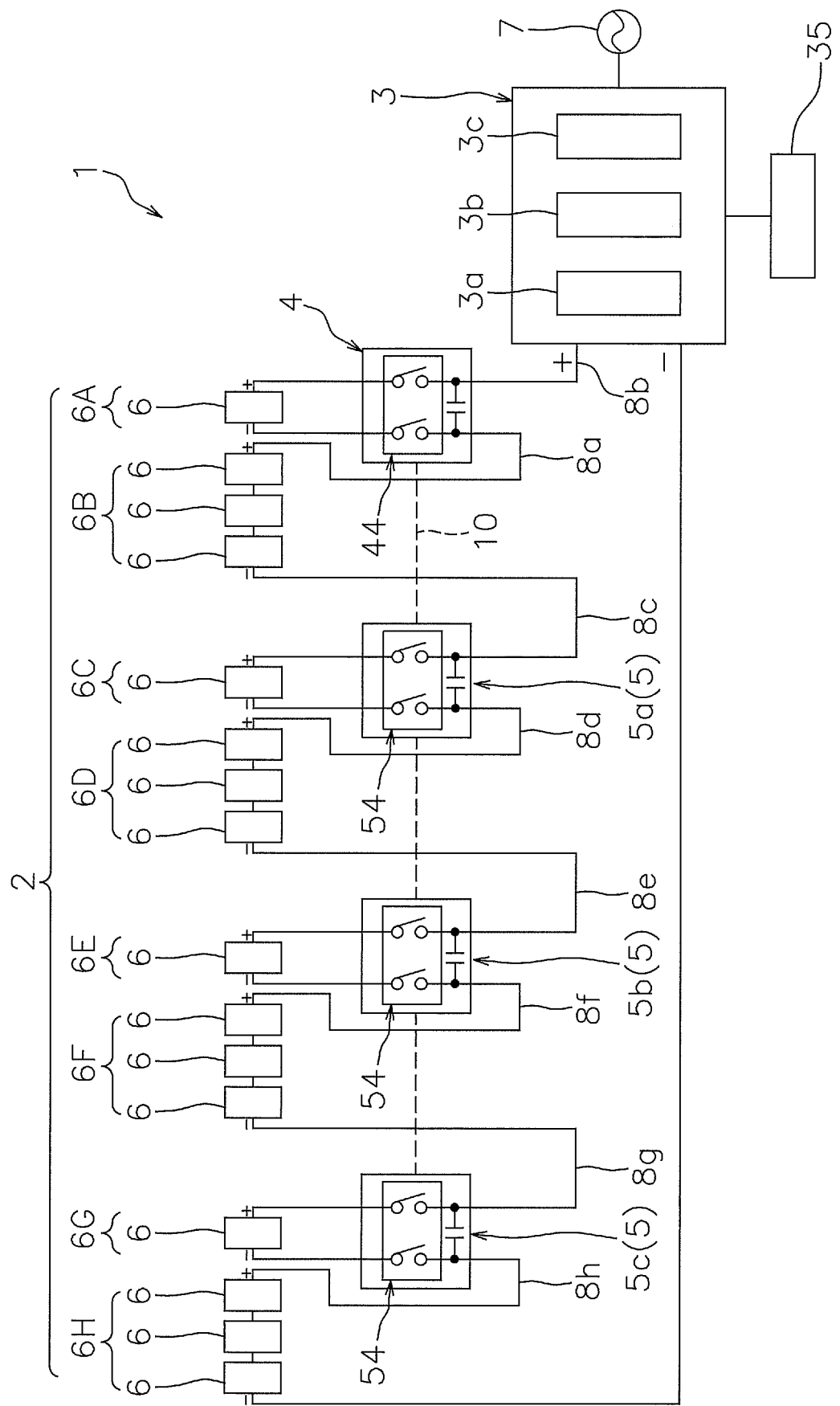
FIG. 1 is a block diagram schematically showing a configuration of a solar power generation system according to one aspect of the present invention.

FIG. 1 is a block diagram schematically showing a configuration of a solar power generation system 1 according to an aspect of the present invention. The solar power generation system 1 includes a string 2, an inverter 3, a first shutoff device 4, and a plurality of second shutoff devices 5.

The string 2 includes a plurality of solar cell module groups 6A to 6H connected in series with each other. The plurality of solar cell module groups 6A to 6H include one or a plurality of solar cell modules 6 connected in series. That is, the string 2 includes a plurality of (16 in the present embodiment) solar cell modules 6 connected in series with each other. It should be noted that the solar power generation system 1 may include a solar cell array in which a plurality of strings 2 are connected in parallel.

The plurality of solar cell module groups 6A to 6H have an open circuit voltage, for each group, equal to or less than a predetermined open circuit voltage. The predetermined open circuit voltage is, for example, 165 V. That is, in the string 2, the plurality of solar cell module groups is divided into groups so that each group has an open circuit voltage of 165 V or less. The solar cell modules 6 have an open circuit voltage of 50 V, for example. Hereinafter, the solar cell module groups 6A to 6H may be referred to as groups 6A to 6H.

Each of the groups 6A, 6C, 6E, and 6G includes one solar cell module 6. Each of the groups 6B, 6D, 6F, and 6H includes three solar cell modules 6 connected in series with each other. Thus, the open circuit voltage of the groups 6A, 6C, 6E, 6G is 50 V, and the open circuit voltage of the groups 6B, 6D, 6F, 6H is 150 V.

The groups 6A to 6H are arranged in alphabetical order from the group 6A to the group 6H and are connected in series with each other. The groups 6A to 6H each include an anode side terminal and a cathode side terminal. The anode side terminal in each of the groups 6A to 6H is the anode side terminal of the solar cell module 6 closest to the anode of the inverter 3 among the plurality of solar cell modules 6 in the groups 6A to 6H. The cathode side terminal in each of the groups 6A to 6H is the cathode side terminal of the solar cell module 6 farthest from the anode of the inverter 3 among the plurality of solar cell modules 6 in the groups 6A to 6H.

For example, the anode side terminal of the group 6A is the anode side terminal of a solar cell module 6 in the group 6A. The anode side terminal of the group 6A is connected to the anode side terminal of the inverter 3. The cathode side terminal of the group 6A is the cathode side terminal of a solar cell module 6 in the group 6A. The cathode side terminal of the group 6A is connected to the anode side terminal of the group 6B.

For example, the anode side terminal of the group 6B is the anode side terminal of the solar cell module 6 closest to the group 6A among the solar cell modules 6 in the group 6B. The cathode side terminal of the group 6B is the cathode side terminal of the solar cell module 6 farthest from the group 6A among the solar cell modules 6 in the group 6B. The cathode side terminal of the group 6B is connected to the anode side terminal of the group 6C.

The cathode side terminal of the group 6C is connected to the anode side terminal of the group 6D. The cathode side terminal of the group 6D is connected to the anode side terminal of the group 6E. The cathode side terminal of the group 6E is connected to the anode side terminal of the group 6F. The cathode side terminal of the group 6F is connected to the anode side terminal of the group 6G. The cathode side terminal of the group 6G is connected to the anode side terminal of the group 6H. The cathode side terminal of the group 6H is connected to the cathode side terminal of the inverter 3.

The solar cell modules 6 receive sunlight to generate power, and output the generated power to the inverter 3. The inverter 3 is connected to the string 2 via a power line. The inverter 3 converts the DC power from the solar cell modules 6 in the string 2 into AC power. The inverter 3 is connected to a power system 7 and supplies the AC power to the commercial power system and load devices.

Specifically, the inverter 3 includes a DC/DC converter 3a, a DC/AC inverter 3b, and a control unit 3c. The DC/DC converter 3a converts the voltage of the power output from the solar cell modules 6 into a predetermined voltage and inputs it to the DC/AC inverter 3b. The DC/AC inverter 3b converts the DC power output from the solar cell modules 6 into AC power via the DC/DC converter 3a. The control unit 3c includes a CPU and memory, and controls the DC/DC converter 3a and the DC/AC inverter 3b. The control unit 3c outputs a first control signal to the first shutoff device 4 by power line communication.

The first shutoff device 4 is connected to electric paths connecting between the groups 6A to 6H. In the present embodiment, the first shutoff device 4 is connected to an electric path 8a connecting the group 6A and the group 6B and an electric path 8b connecting the inverter 3 and the group 6A. The first shutoff device 4 cuts off the connection between the group 6A and the group 6B and the connection between the inverter 3 and the group 6A in response to a first control signal from the inverter 3.

The first shutoff device 4 outputs a second control signal to the plurality of second shutoff devices 5 via a communication line 10 connected to the first shutoff device 4 and the plurality of second shutoff devices 5 by a communication system different from power line communication. The first shutoff device 4 outputs a second control signal to the plurality of second shutoff devices 5, for example, by a serial communication method such as Local Interconnect Network (LIN) communication or Serial Peripheral Interface (SPI) communication. The first shutoff device 4 cuts off the connection between the group 6A and the group 6B and the connection between the inverter 3 and the group 6A, and then outputs a second control signal to the plurality of second shutoff devices 5. The first shutoff device 4 is connected to each of the plurality of second shutoff devices 5 via the communication line 10.

The first shutoff device 4 and the plurality of second shutoff devices 5 are in a master-slave relationship. The first shutoff device 4 functions as a master for the second shutoff devices 5, and the plurality of second shutoff devices 5 functions as a slave for the first shutoff device 4. That is, the first shutoff device 4 controls the plurality of second shutoff devices 5.

Figure 2:
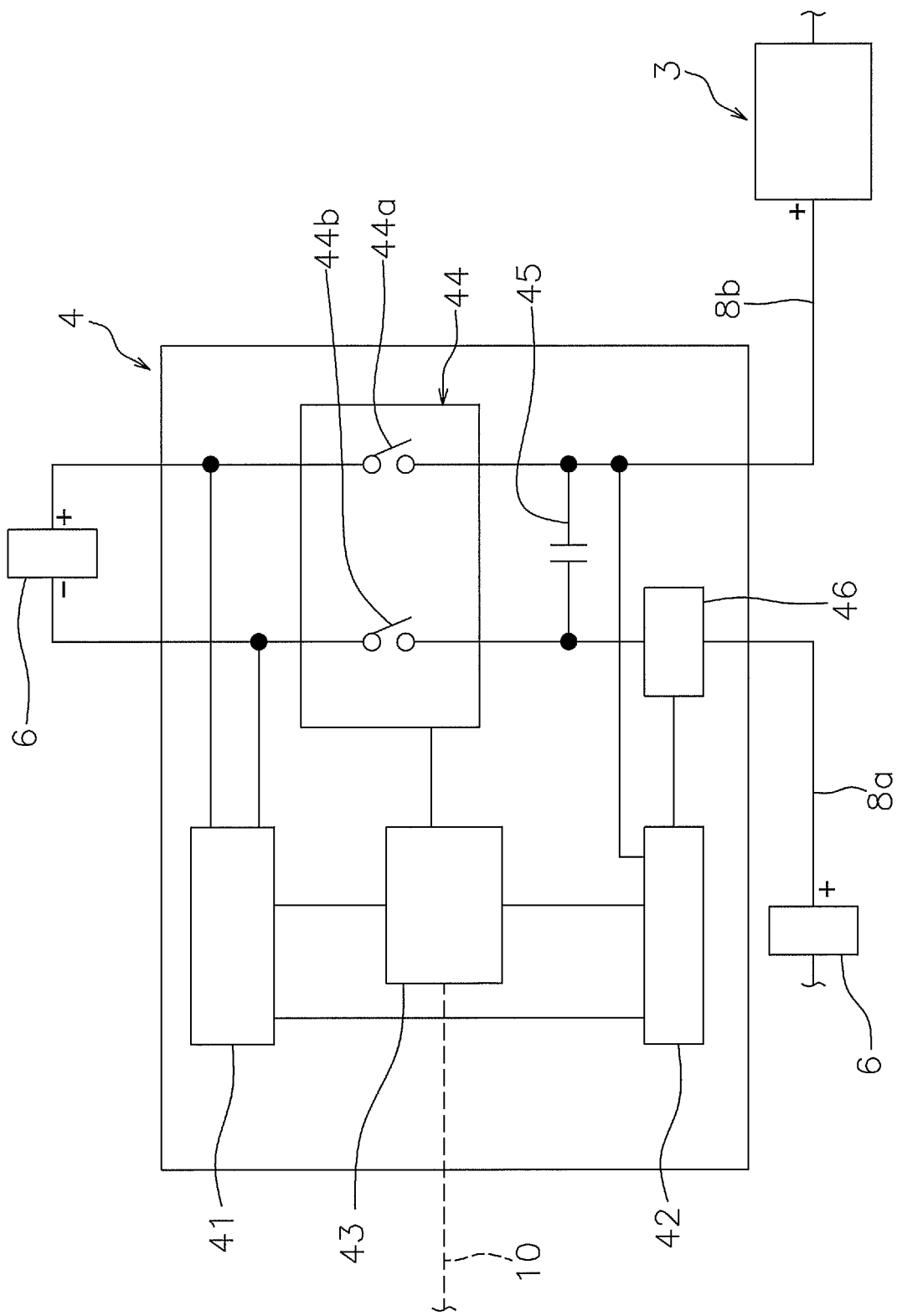
FIG. 2 is a block diagram schematically showing a configuration of a first shutoff device.

FIG. 2 is a block diagram schematically showing a configuration of the first shutoff device 4. The first shutoff device 4 includes a regulator 41, a signal receiving unit 42, a control unit 43, a cutoff-connection unit 44, and a bypass circuit 45.

The regulator 41 uses the power generated by the solar cell modules 6 as power source and generates power source for driving the first shutoff device 4, so as to supply the first shutoff device 4 with stable drive power. Here, only the power generated by the solar cell modules 6 of group 6A is used to generate the power source for driving the first shutoff device 4.

Figure 3:
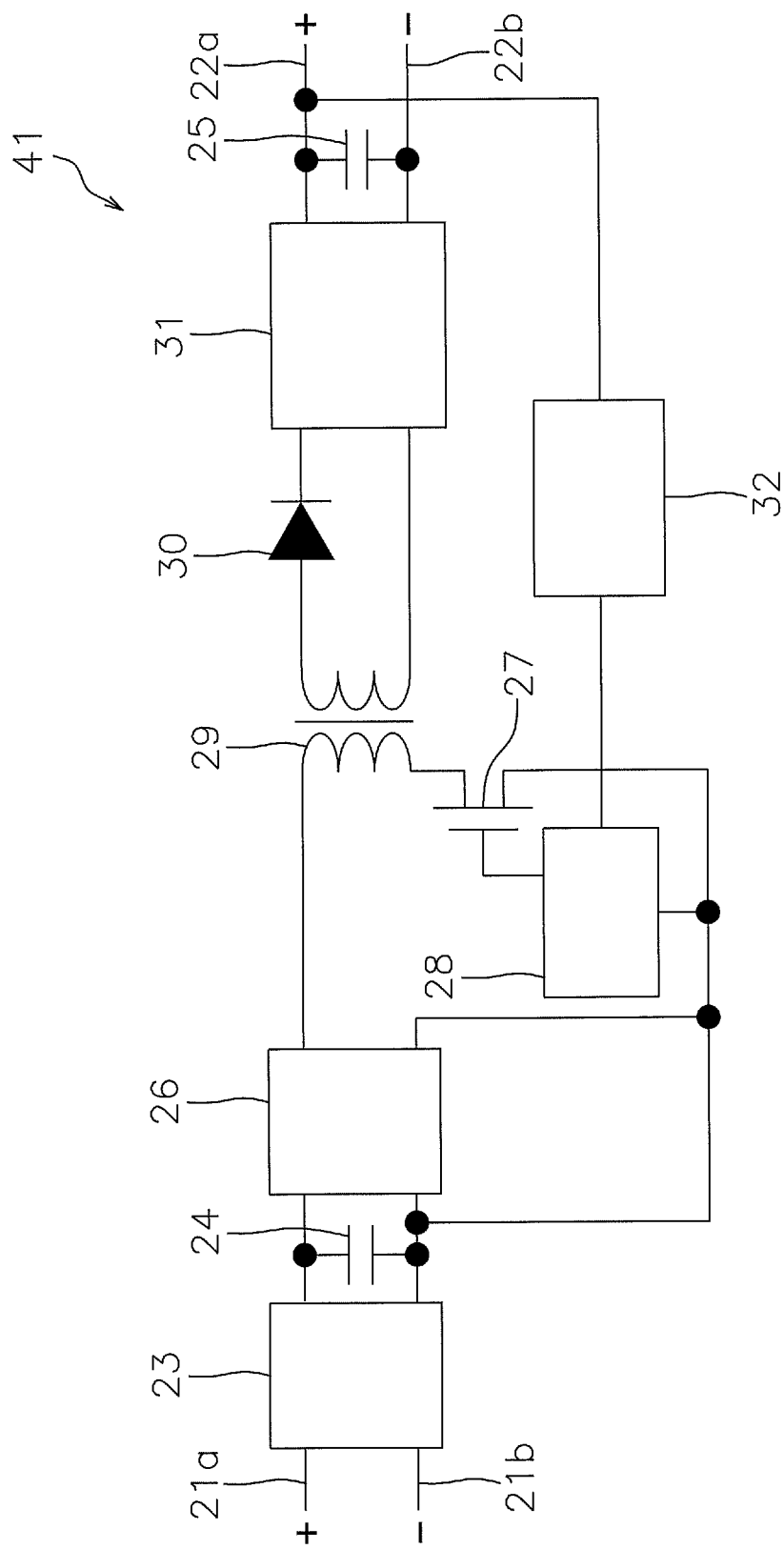
FIG. 3 is a circuit diagram schematically showing a configuration of a regulator.

FIG. 3 is a circuit diagram schematically showing a configuration of the regulator 41. The regulator 41 has a well-known configuration and includes input terminals 21a and 21b, output terminals 22a and 22b, a line filter 23, capacitors 24 and 25, a booster circuit 26, a switching element 27, a control circuit 28, a transformer 29, a diode 30, a DC/DC converter 31, and a feedback circuit 32.

The signal receiving unit 42 receives a first control signal from the control unit 3c of the inverter 3 and outputs the received first control signal to the control unit 43. Specifically, the signal receiving unit 42 receives a first control signal from the control unit 3c of the inverter 3 via a signal detecting unit 46 configured to detect a first control signal from the control unit 3c of the inverter 3.

The control unit 43 includes a CPU and memory. The control unit 43 controls the cutoff-connection unit 44 based on the signals output from the signal receiving unit 42. The cutoff-connection unit 44 is able to connect and cut-off a high voltage DC current.

The control unit 43 outputs a second control signal to the plurality of second shutoff devices 5 via the communication line 10 by a communication system different from power line communication. The control unit 43 cuts off the connection between the group 6A and the group 6B, and then outputs a second control signal to the plurality of second shutoff devices 5. The control unit 43 determines whether or not the connection between the group 6A and the group 6B is cut off, by monitoring the voltage between the contacts of the cutoff-connection unit 44, for example.

The cutoff-connection unit 44 includes a first switching unit 44a and a second switching unit 44b. The first switching unit 44a is arranged in the electric path 8b. The first switching unit 44a connects the inverter 3 and the group 6A and cuts off the connection therebetween. The first switching unit 44a is connected to the anode side terminal of the group 6A and the anode side terminal of the inverter 3. The second switching unit 44b is arranged in the electric path 8a. The second switching unit 44b connects the group 6A and the group 6B and cuts off the connection therebetween. The second switching unit 44b is connected to the cathode side terminal of the group 6A and the anode side terminal of the group 6B. In the present embodiment, the second switching unit 44b may be omitted.

When the drive power is not supplied from the regulator 41 to the first shutoff device 4, the first switching unit 44a and the second switching unit 44b are in an OFF state all the time. Accordingly, when the first shutoff device 4 is not driven, the connection between the inverter 3 and the group 6A and the connection between the group 6A and the group 6B are in a cutoff state.

The bypass circuit 45 is a circuit that is configured to enable the signal receiving unit 42 to receive a first control signal from the control unit 3c when the first shutoff device 4 is in the cutoff state. When the electric paths 8a and 8b are in the cutoff state by the first shutoff device 4, the signal receiving unit 42 is able to receive a first control signal from the control unit 3c via the bypass circuit 45.

The plurality of second shutoff devices 5 are connected to electric paths 8c to 8h connecting between the groups 6C to 6H other than the groups 6A and 6B connected to the electric path 8a. The plurality of second shutoff devices 5 cut off the connections between the groups 6C to 6H in response to a second control signal output from the first shutoff device 4 via the communication line 10. In the present embodiment, the plurality of second shutoff devices 5 include three second shutoff devices 5a to 5c.

The second shutoff device 5a is connected to the electric path 8c connecting the group 6B and the group 6C and the electric path 8d connecting the group 6C and the group 6D. The second shutoff device 5b is connected to an electric path 8e connecting the group 6D and the group 6E and an electric path 8f connecting the group 6E and the group 6F. The second shutoff device 5c is connected to an electric path 8g connecting the group 6F and the group 6G and an electric path 8h connecting the group 6G and the group 6H.

Figure 4:
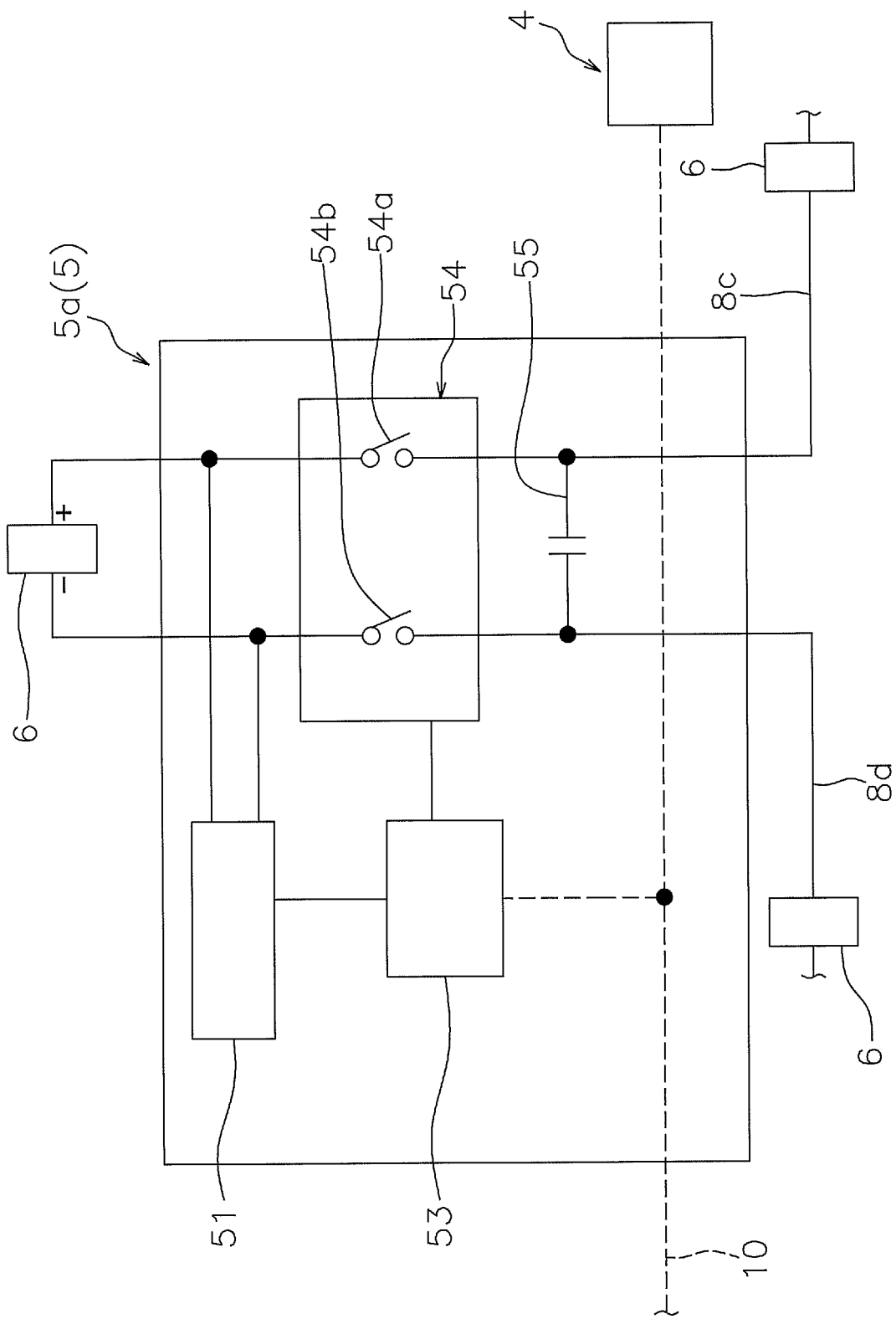
FIG. 4 is a block diagram schematically showing a configuration of a second shutoff device.

FIG. 4 is a block diagram schematically showing a configuration of the second shutoff device 5a. The second shutoff device 5a includes a regulator 51, a control unit 53, a cutoff-connection unit 54, and a bypass circuit 55.

The regulator 51 uses the power generated by the solar cell modules 6 as power source and generates power source for driving the second shutoff device 5a, so as to supply the second shutoff device 5a with stable drive power. Here, only the power generated by the solar cell modules 6 of group 6C is used to generate the power source for driving the first shutoff device 4. The configuration of the regulator 51 is similar to that of the regulator 41 of the first shutoff device 4, and thereby detailed description thereof will be omitted.

The control unit 53 includes a CPU and memory. The control unit 53 controls the cutoff-connection unit 54 in response to a second signal output from the first shutoff device 4. The cutoff-connection unit 54 is able to connect and cut off a high voltage DC current. The control unit 53 turns OFF the cutoff-connection unit 54 in response to a second signal output from the first shutoff device 4 via a communication interface (not shown) connected to the communication line 10.

The cutoff-connection unit 54 includes a third switching unit 54a and a fourth switching unit 54b. The third switching unit 54a is arranged in the electric path 8c. The third switching unit 54a connects the group 6B and the group 6C and cuts off therebetween. The third switching unit 54a is connected to the cathode side terminal of group 6B and the anode side terminal of group 6C. The fourth switching unit 54b is arranged in the electric path 8d. The fourth switching unit 54b connects the group 6C and the group 6D and cuts off therebetween. The fourth switching unit 54b is connected to the cathode side terminal of group 6C and the anode side terminal of group 6D.

When the drive power is not supplied from the regulator 51 to the second shutoff device 5a, the third switching unit 54a and the fourth switching unit 54b are in an OFF state all the time. Accordingly, when the second shutoff device 5a is not driven, the connection between the group 6B and the group 6C and the connection between the group 6C and the group 6D are in a cutoff state.

The bypass circuit 55 is a circuit that is configured to enable the signal receiving unit 42 of the first shutoff device 4 to receive a first control signal from the control unit 3c by power line communication when the second shutoff device 5 is in the cutoff state. The bypass circuit 55 enables the power line communication to continue.

The cutoff-connection unit 54 of the second shutoff device 5b connects between the group 6D and the group 6E and between the group 6E and 6F and cuts off the connections therebetween. The cutoff-connection unit 54 of the second shutoff device 5c connects between the group 6F and the group 6G and between the group 6G and the group 6H and cuts off the connections therebetween. The second shutoff device 5b and the second shutoff device 5c have the same configuration as the second shutoff device 5a, except that the electric path to be connected, and thereby the detailed description thereof will be omitted.

It should be noted that the plurality of second shutoff devices 5 of the present embodiment are not configured to communicate with each other. Also, the plurality of second shutoff devices 5 are not configured to output signals to the first shutoff device 4.

Figure 5:
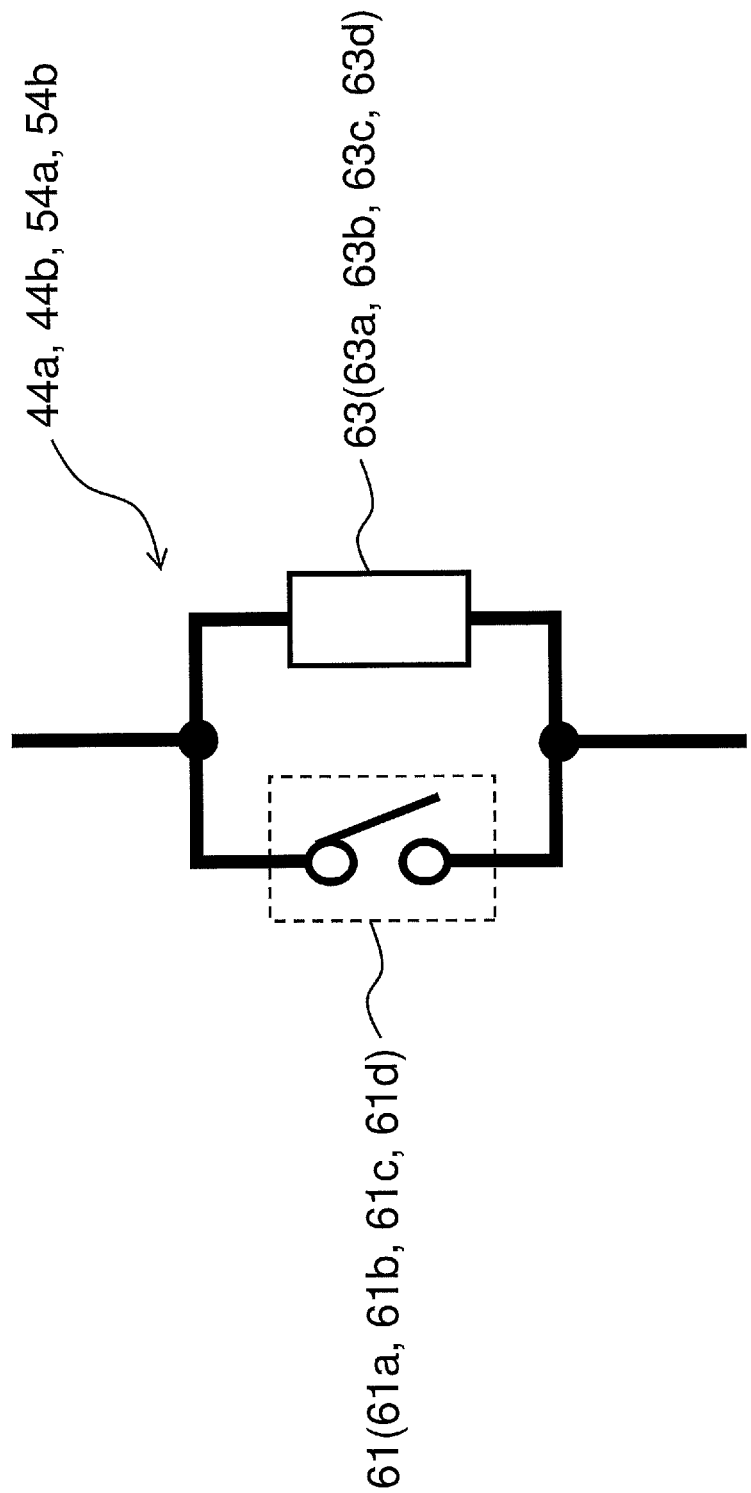
FIG. 5 is a diagram illustrating a configuration of a switching unit.

The configurations of the first switching unit 44a, the second switching unit 44b, the third switching unit 54a, and the fourth switching unit 54b will be described below with reference to FIG. 5. FIG. 5 is a diagram showing an example of the configuration of a switching unit which has an open and close unit 61 and a semiconductor switching device 63.

The open and close unit 61 is, for example, a switching device that is configured to open and close a contact to connect and cut off an electric path connected to the open and close unit 61. The open and close unit 61 is, for example, a relay. The open and close unit 61 (a first open and close unit 61a) of the first switching unit 44a has one end connected to the anode side terminal of the group 6A and the other end connected to the anode side terminal of the inverter 3, so as to be driven to open and close by the control unit 43. The open and close unit 61 (a third open and close unit 61b) of the second switching unit 44b has one end connected to the cathode side terminal of the group 6A and the other end connected to the anode side of the group 6B, so as to be driven to open and close by the control unit 43. The open and close unit 61 (a fifth open and close unit 61c) of the third switching unit 54a has one end connected to the anode side terminal of the group 6C and the other end connected to the cathode side terminal of the group 6B, so as to be driven to open and close by the control unit 53. The open and close unit 61 (a seventh open and close unit 61d) of the fourth switching unit 54b has one end connected to the cathode side terminal of the group 6C and the other end connected to the anode side terminal of the group 6D, so as to be driven to open and close by the control unit 53.

The semiconductor switching device 63 is connected in parallel with the open and close unit 61, and turns an electric path other than the open and close unit 61 conductive or insulated. The semiconductor switching device 63 is, for example, a MOSFET device or an Insulated Gate Bipolar Transistor (IGBT) device.

The semiconductor switching device 63 (a first semiconductor switching device 63a) of the first switching unit 44a has a gate electrode, and the semiconductor switching device 63 (a second semiconductor switching device 63b) of the second switching unit 44b has a gate electrode, and these gate electrodes are connected to the control unit 43. The control unit 43 is configured to output a predetermined voltage signal to these gate terminals so as to enter the first semiconductor switching device 63a and the second semiconductor switching device 63b an ON state or an OFF state. Here, the "ON state" means that the semiconductor switching device 63 becomes conductive, and the "OFF state" means that the semiconductor switching device 63 becomes insulated.

The semiconductor switching device 63 (a third semiconductor switching device 63c) of the third switching unit 54a has a gate electrode, and the semiconductor switching device 63 (a fourth semiconductor switching device 63d) of the fourth switching unit 54b has a gate electrode. These gate electrodes are connected to the control unit 53. The control unit 53 is configured to output a predetermined voltage signal to these gate terminals so as to enter the third semiconductor switching device 63c and the fourth semiconductor switching device 63d an ON state or an OFF state.

When a voltage signal is output to the gate terminals to turn ON or OFF the semiconductor switching device 63 such as a MOSFET device or an IGBT device, almost no current flows through the gate terminals. Using such a MOSFET device, an IGBT device, or the like as the semiconductor switching device 63 leads to reduction of the power required to turn the semiconductor switching device 63 ON or OFF.

When the amount of power generated by the solar cell module groups for driving the switching unit is small and/or unstable, the open and close unit 61 often opens and closes according to the power generation. Specifically, when the amount of power generated by the solar cell module groups for driving the switching unit is smaller than the power required for driving the open and close unit 61, even if an attempt is made to close the open and close unit 61, the closed open and close unit 61 may become open due to lack of the drive power. This action may be repeated, leading to a phenomenon in which opening or closing of the open and close unit 61 are repeated. Also, when the amount of power generated by the solar cell module groups for driving the switching unit is unstable, the open and close unit 61 may become open and closed repeatedly. These phenomena destabilize the operation of the solar power generation system 1.

Therefore, when the amount of power generated by the solar cell module groups for driving the switching unit is smaller than the power required for driving the open and close unit 61 and/or when the amount of power generated by the solar cell module groups is unstable, the semiconductor switching device 63 is turned ON before the open and close unit 61 is operated to open and close. That is, before opening or closing of the open and close unit 61, an electric path other than the open and close unit 61 is brought into a conductive state. Specifically, when the open and close unit 61 is switched from the open state to the closed state in order to turn the switching unit ON, the semiconductor switching device 63 is turned ON while keeping the open and close unit 61 open, and then, the open and close unit 61 is switched from the open state to the closed state.

After the open and close unit 61 has entered the closed state, the semiconductor switching device 63 may remain in the ON state or be switched to the OFF state. This is because, with the open and close unit 61 in the closed state, the switching unit can be turned ON regardless of the state of the semiconductor switching device 63. Whether to keep the semiconductor switching device 63 in the ON state or to switch it to the OFF state can be appropriately determined depending on the usage or the like.

When the open and close unit 61 is switched from the closed state to the open state in order to turn the switching unit OFF, the semiconductor switching device 63 is turned ON while the open and close unit 61 remains closed, and then the open and close unit 61 is switched from the closed state to the open state. After the open and close unit 61 has entered the opened state, the semiconductor switching device 63 is switched from the ON state to the OFF state. It should be noted that this operation is preferably performed before the amount of power generated by the solar cell module groups for driving the switching unit decreases and/or becomes unstable.

With the above operations, when the amount of power generated by the solar cell module groups for driving the switching unit is small and/or when the amount of power generated by the solar cell module groups is unstable, it is possible to reduce the occurrence of the phenomenon in which the open and close unit 61 of the switching unit is opened and closed repeatedly. This is because the open and close unit 61 does not operate when the amount of power generated by the solar cell module is small and/or unstable. As a result, the solar power generation system 1 can operate stably even when the amount of power generated by the solar cell module groups is small and/or unstable.

Even when the amount of power generated by the solar cell module groups for driving the switching unit is stable and sufficiently large, in order to open or close the open and close unit 61, the semiconductor switching device 63 is turned ON before the open and close unit 61 is operated.

The semiconductor switching device 63 such as a MOSFET device or an IGBT device has a characteristic that it hardly generates a noise at its switching between an ON state and an OFF state. Also, the open and close unit 61 such as a relay does not generate a large noise unless a large voltage is applied across the open and close unit 61 in its opening and closing. Accordingly, turning on the semiconductor switching device 63 before the open and close unit 61 is opened or closed precludes a large voltage from being applied across the open and close unit 61, and thereby the open and close unit 61 is unlikely to generate a noise in its opening and closing. As a result, noise to be generated is reduced in the switching unit, and the operation of the solar power generation system 1 is stabilized.

Also, since a large noise is not generated in the open and close unit 61, the open and close unit 61 does not need to have a large voltage tolerance, resulting in cost reduction of the open and close unit 61.

Figure 6:
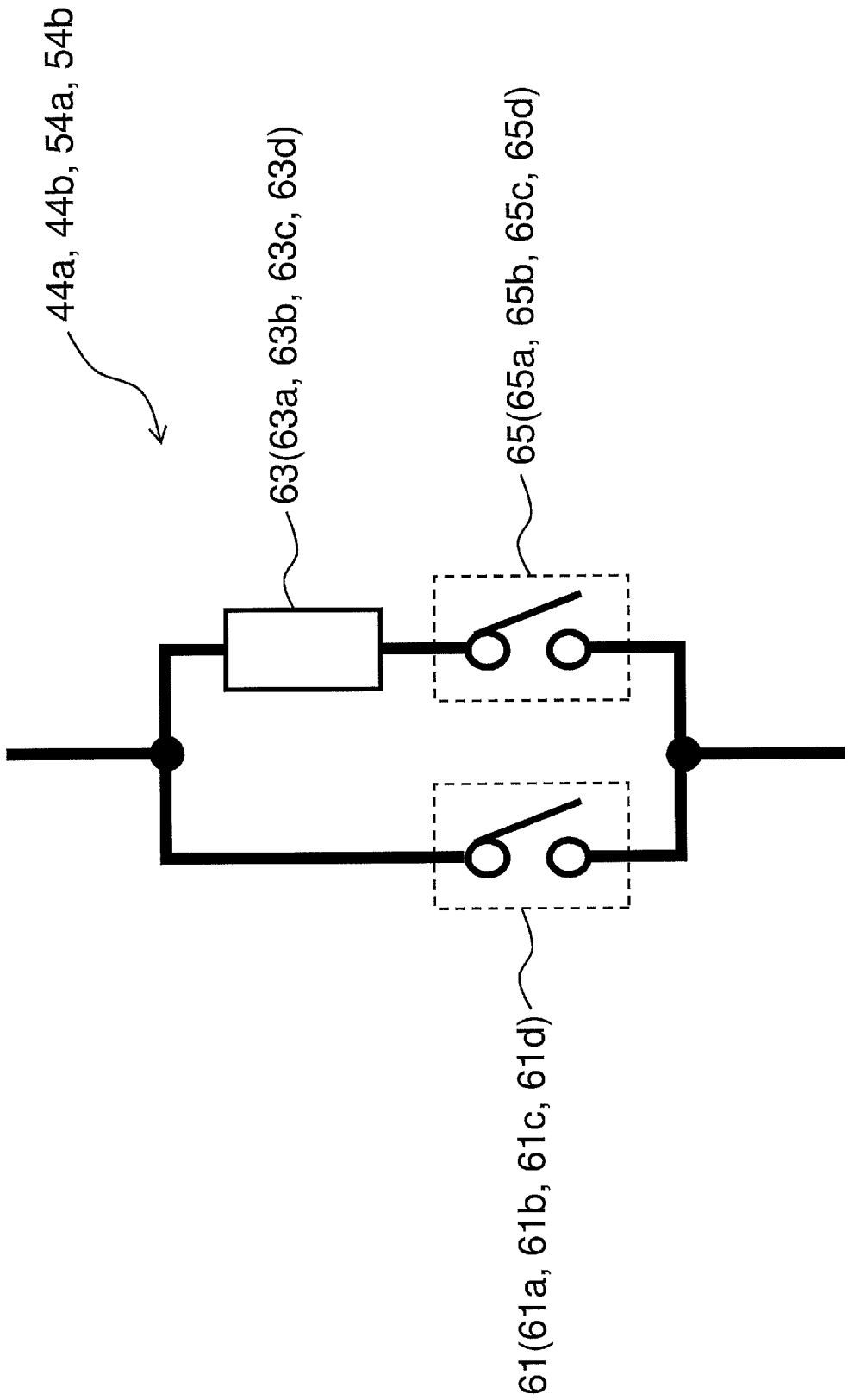
FIG. 6 is a diagram showing a configuration of another switching unit.

As another configuration of the switching unit, another open and close unit 65 may be connected in series with the semiconductor switching device 63, as shown in FIG. 6. The semiconductor switching device 63 is merely electrically insulated by alternately arranging P-type semiconductor regions and N-type semiconductor regions in a semiconductor material. That is, the semiconductor switching device 63 is not able to be completely insulated. In contrast, the open and close unit completely cuts off the electric path when the two contacts are separated from each other for cutoff. Thus, by connecting the open and close unit 65 to the semiconductor switching device 63 in series, the semiconductor switching device 63 can be electrically cut off from the solar power generation system 1 reliably. The open and close unit 65 for the first switching unit 44a is the second open and close unit 65a. Another open and close unit 65 for the second switching unit 44b is the fourth open and close unit 65b. Another open and close unit 65 for the third switching unit 54a is the sixth open and close unit 65c. Another open and close unit 65 for the fourth switching unit 54b is the eighth open and close unit 65d. FIG. 6 is a diagram showing an example of another switching unit.

Figure 7:
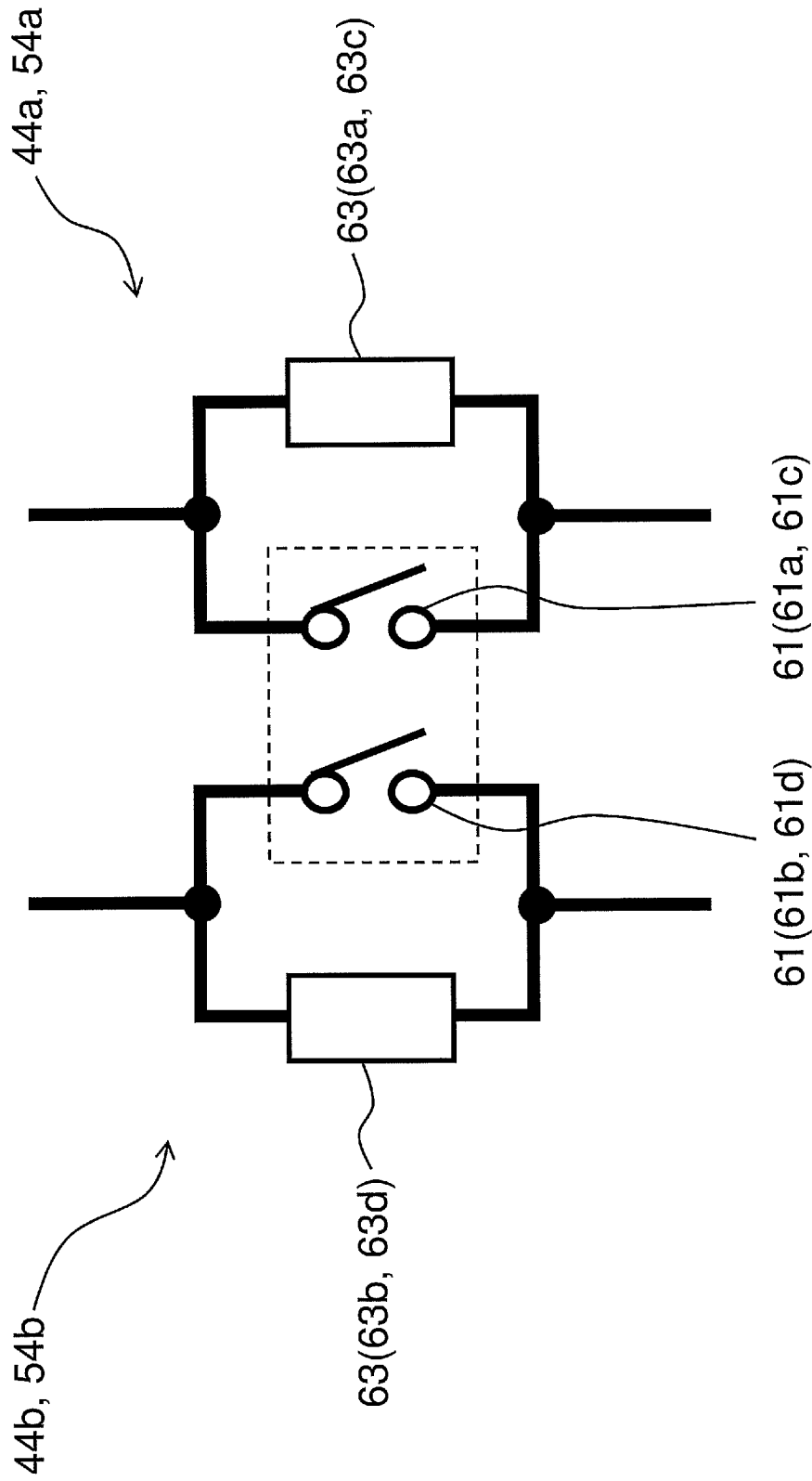
FIG. 7 is a diagram showing a configuration of another switching unit.

As another example of the configuration of the switching unit, as shown in FIG. 7, when a switching device (two-pole switching element) including a plurality of open and close units 61 is used in the switching unit, the semiconductor switching device 63 is arranged in each open and close unit 61. In this case, before opening or closing each open and close unit 61, the semiconductor switching device 63, which is connected in parallel with the open and close unit 61 to be opened and closed, is turned ON. FIG. 7 is a diagram showing another example of a configuration of a switching unit.

Next, an example of operation modes of the first shutoff device 4 and the plurality of second shutoff devices 5 will be described with reference to FIG. 8. The operation modes of the first shutoff device 4 and the plurality of second shutoff devices 5 include three operating modes: a start mode, an active mode, and a safety mode. The safety mode includes a normal shutoff mode and an emergency safety shutoff mode. Accordingly, the first shutoff device 4 and the plurality of second shutoff devices 5 operate in four operating modes: the start mode, the active mode, the normal shutoff mode, and the emergency safety shutoff mode.

The start mode is a mode that turns effective when sunlight starts to hit the solar cell modules 6. At this time, the solar cell modules 6 receive sunlight to generate power. The solar cell modules 6 generate power, from which the regulator 41 generates drive power, and the first shutoff device 4 is driven by the power. When the first shutoff device 4 is driven and the control unit 43 receives a first control signal from the control unit 3c of the inverter 3 via the signal receiving unit 42, the control unit 43 turns the first semiconductor switching device 63a and the second semiconductor switching device 63b ON, and then closes the first open and close unit 61a and the third open and close unit 61b. As a result, the first switching unit 44a and the second switching unit 44b are turned ON.

Similarly, the second shutoff device 5a is driven by the drive power generated by the regulator 51 of the second shutoff device 5a from the power generated by the solar cell module 6. When the second shutoff device 5a is driven and, for example, the control unit 53 receives a command signal from the first shutoff device 4 different from a second control signal, the control unit 53 turns ON the third semiconductor switching device 63c and the fourth semiconductor switching device 63d, and then closes the fifth open and close unit 61c and the seventh open and close unit 61d. As a result, the third switching unit 54a and the fourth switching unit 54b are turned ON. The second shutoff device 5b and the second shutoff device 5c also operate in the same manner as the second shutoff device 5a. As a result, the groups 6A to 6H are connected to the string 2 via the first shutoff device 4 and the second shutoff devices 5a to 5c, and the power generated by the solar cell modules 6 is output to the inverter 3.

In the start mode in which sunlight begins to hit the solar cell modules 6, the amount of power generated from each solar cell module group is small. Thus, in the start mode, the first open and close unit 61a, the third open and close unit 61b, the fifth open and close unit 61c, and the seventh open and close unit 61d, which are driven by the power generated by the solar cell module groups, often repeatedly open and close, destabilizing the operation of the solar power generation system 1.

For this reason, in the start mode, first, the first semiconductor switching device 63a to the fourth semiconductor switching device 63d are turned ON when the amount of power generated by the solar cell module groups is small. At this time, the first open and close unit 61a, the third open and close unit 61b, the fifth open and close unit 61c, and the seventh open and close unit 61d are in the open state. Next, when the amount of power generated by the solar cell module groups becomes larger than the power required for driving the first open and close unit 61a, the third open and close unit 61b, the fifth open and close unit 61c, and the seventh open and close unit 61d, these open and close units are closed. With the configuration, in the start mode in which the amount of power generated by the solar cell module groups is smaller than the power for driving the open and close units, the first open and close unit 61a, the third open and close unit 61b, the fifth open and close unit 61c, and the seventh open and close unit 61d remain in the open state, and thereby it is possible to reduce the occurrence of the phenomenon that the open and close units repeatedly open and close. As a result, the operation of the solar power generation system 1 in the start mode is stabilized. In addition, the switching unit can be turned ON by an electric path (that is, the semiconductor switching device 63) other than the open and close unit 61. Thus, an electric path connecting the string 2 and the inverter 3 is secured in the start mode.

The active mode is a state in which the solar cell modules 6 receive sunlight during the day to generate power, and is substantially the same as the start mode. Accordingly, in the active mode, the groups 6A to 6H are connected via the first shutoff device 4 and the second shutoff devices 5a to 5c, and the power generated by the solar cell modules 6 is output to the inverter 3.

In the active mode, when the amount of power generated by each solar cell module group decreases (for example, when the solar cell module is shaded), the first semiconductor switching device 63a to the fourth semiconductor switching device 63d are turned ON, and the first open and close unit 61a, the third open and close unit 61b, the fifth open and close unit 61c, and the seventh open and close unit 61d are opened. After that, when the amount of power generated by the solar cell module groups becomes larger than the power required for driving the open and close unit 61, the first open and close unit 61a, the third open and close unit 61b, the fifth open and close unit 61c, and the seventh open and close unit 61d are switched from the open state to the closed state. As such, in the active mode, when the amount of power generated by the solar cell module groups becomes small, the first open and close unit 61a, the third open and close unit 61b, the fifth open and close unit 61c, and the seventh open and close unit 61d are switched from the closed state to the open state, and thereby it is possible to reduce the occurrence of the phenomenon that the open and close unit 61 repeatedly opens and closes. As a result, the operation of the solar power generation system 1 is stabilized. In addition, since the switching unit can be turned ON by an electric path (that is, a semiconductor switching device 63) other than the open and close unit 61, even if the amount of power generated by the solar cell module groups decreases in the active mode, the power generated in the string 2 can be supplied to the inverter 3.

The normal shutoff mode is a mode when the solar cell modules 6 are not exposed to sunlight at night or due to the influence of bad weather such as rain. Accordingly, in the normal shutoff mode, the solar cell modules 6 do not generate power, and no power is supplied from the solar cell modules 6 to the first shutoff device 4 and the second shutoff devices 5a to 5c. For this reason, in the normal shutoff mode, the first switching unit 44a and the second switching unit 44b of the first shutoff device 4 and the third switching unit 54a and the fourth switching unit 54b of the second shutoff devices 5a to 5c are all in the open state. It should be noted that, in the normal shutdown mode, no first control signal is output from the control unit 3c of the inverter 3. However, an AC power source supplies power to the inverter 3, and thereby the control unit 3c of the inverter 3 may output a first control signal at any time except during the emergency safety shutdown mode.

In the normal shutoff mode, for example, when the power generation by the solar cell modules 6 is unstable due to unstable weather or the like, the open and close unit 61 repeatedly opens and closes and the operation of the solar power generation system 1 becomes unstable. Thus, when the amount of power generated by the solar cell module groups becomes unstable due to unstable weather or the like, the first semiconductor switching device 63a to the fourth semiconductor switching device 63d are turned ON, and the first open and close unit 61a, the third open and close unit 61b, the fifth open and close unit 61c, and the seventh open and close unit 61d are opened. After that, when the amount of power generated by the solar cell module groups becomes larger than the power required for driving the open and close unit 61 and stabilizes, the first open and close unit 61a, the third open and close unit 61b, the fifth open and close unit 61c, and the seventh open and close unit 61d are switched from the open state to the closed state. As such, when the amount of power generated by the solar cell module groups is unstable, the first open and close unit 61a, the third open and close unit 61b, the fifth open and close unit 61c, and the seventh open and close unit 61d are kept in the open state, and thereby it is possible to reduce the occurrence of the phenomenon that the open and close unit 61 repeatedly opens and closes. As a result, the operation of the solar power generation system 1 is stabilized.

The emergency safety shutoff mode is a mode in which the electric paths 8a to 8h are cut off to stop the power output from the solar cell modules 6 to the inverter 3 during the start mode or the active mode. In the present embodiment, as shown in FIG. 1, the operation switch 35 is connected to the inverter 3, and when the operation switch 35 is operated when the first shutoff device 4 is in the start mode or the active mode, the operating mode of the first shutoff device 4 is switched to the emergency safety shutoff mode.

Specifically, upon an operation of the operation switch 35, the control unit 3c stops outputting of a first control signal. When the signal detecting unit 46 detects the stop of outputting of a first control signal for a fixed period, the first switching unit 44a and the second switching unit 44b of the cutoff-connection unit 44 are turned OFF via the signal receiving unit 42 and the control unit 43. As a result, the connection between the group 6A and the group 6B and the connection between the inverter 3 and the group 6A are cut off, and the power output from the solar cell modules 6 to the inverter 3 is stopped. At this time, the first shutoff device 4 turns OFF the first switching unit 44a and the second switching unit 44b of the cutoff-connection unit 44, and then outputs a second control signal to the second shutoff devices 5a to 5c via the communication line 10. The second shutoff devices 5a to 5c receive the second control signal from the first shutoff device 4 and cut off the connections between the groups 6C to 6H. As a result, the groups 6A to 6H are all separated from each other, so that the open circuit voltage of the string 2 is divided to 165 V or less.

In the solar power generation system 1 having the above configuration, the first shutoff device 4 and the second shutoff devices 5a to 5c are in a master-slave relationship, and the second shutoff devices 5a to 5c cut off the connections between the plurality of solar cell module groups 6B to 6H in response to a second control signal output from the first shutoff device 4. Thus, the second shutoff devices 5a to 5c may exclude the functions of the signal receiving unit 42 and the signal detecting unit 46. As a result, the configuration of the second shutoff devices 5a to 5c can be simplified, reducing the installation cost of the plurality of second shutoff devices 5.

The plurality of solar cell module groups 6A to 6H each have an open circuit voltage of 165 V or less. Thus, a safe solar power generation system can be provided. The second control signal from the first shutoff device 4 is output via a communication line 10 by a communication system different from power line communication, and thereby the signal is unlikely to be affected by noise as compared with the power line communication, and the communication from the first shutoff device 4 to the plurality of second shutoff devices 5 can be stabilized.

In the solar power generation system 1 having the above configuration, the first shutoff device 4 cuts the connections between the groups 6A to 6B, and then the second shutoff devices 5a to 5c cut the connections between the groups 6B to 6H. Thus, the voltage applied to the second shutoff devices 5a to 5c can be decreased. As a result, the cost associated with the second shutoff devices can be reduced.

In the above solar power generation system, the switching unit includes the open and close unit 61 and the semiconductor switching device 63 connected in parallel with the open and close unit 61. In addition, the semiconductor switching device 63 is turned ON before the open and close unit 61 is operated. The turning ON of the semiconductor switching device 63 before the opening or closing of the open and close unit 61 leads to reduction in occurrence of the phenomenon that the open and close unit 61 repeatedly opens and closes, because when the amount of power generated by the solar cell module groups for driving the switching unit is small and/or when the amount of power generated by the solar cell module groups is unstable, the open and close unit 61 opens and closes according to the power generation. As a result, the operation of the solar power generation system 1 is stabilized.

Since a large voltage is not applied across the open and close unit 61, the open and close unit 61 is less likely to generate noise and chattering during the opening and closing operations. In addition, the semiconductor switching device 63 has a characteristic that it hardly generates noise and chattering during the switching operation between the ON state and the OFF state. As a result, noise and chattering are reduced in the switching unit, and the operation of the solar power generation system 1 is stabilized.

One embodiment of the present invention has been described above, but the present invention is not limited to the above embodiment, and various modifications can be made without departing from the gist of the invention.

Figure 9:
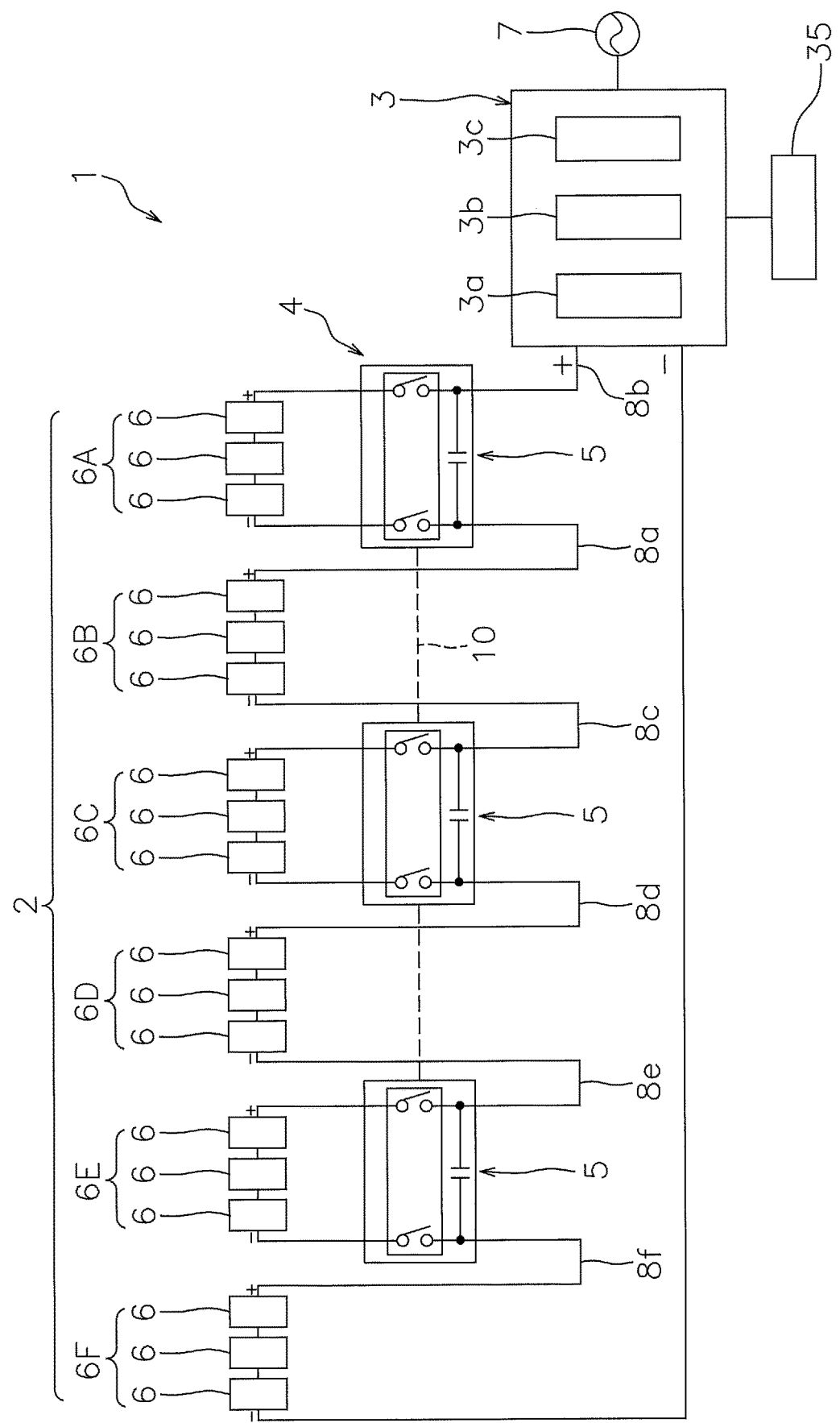
FIG. 9 is a block diagram schematically showing a configuration of a solar power generation system according to another embodiment.

The number of the plurality of solar cell module groups is not limited to the above embodiment. The string 2 may be divided into a plurality of solar cell module groups as long as the open circuit voltage of each group is 165 V or less. For example, the plurality of solar cell module groups 6A to 6F may each include three solar cell modules 6 connected in series, as shown in FIG. 9. That is, the plurality of solar module groups may be divided by the first shutoff device 4 and the plurality of second shutoff devices 5 such that each of the plurality of solar module groups includes three solar cell modules 6 connected in series.

Figure 10:
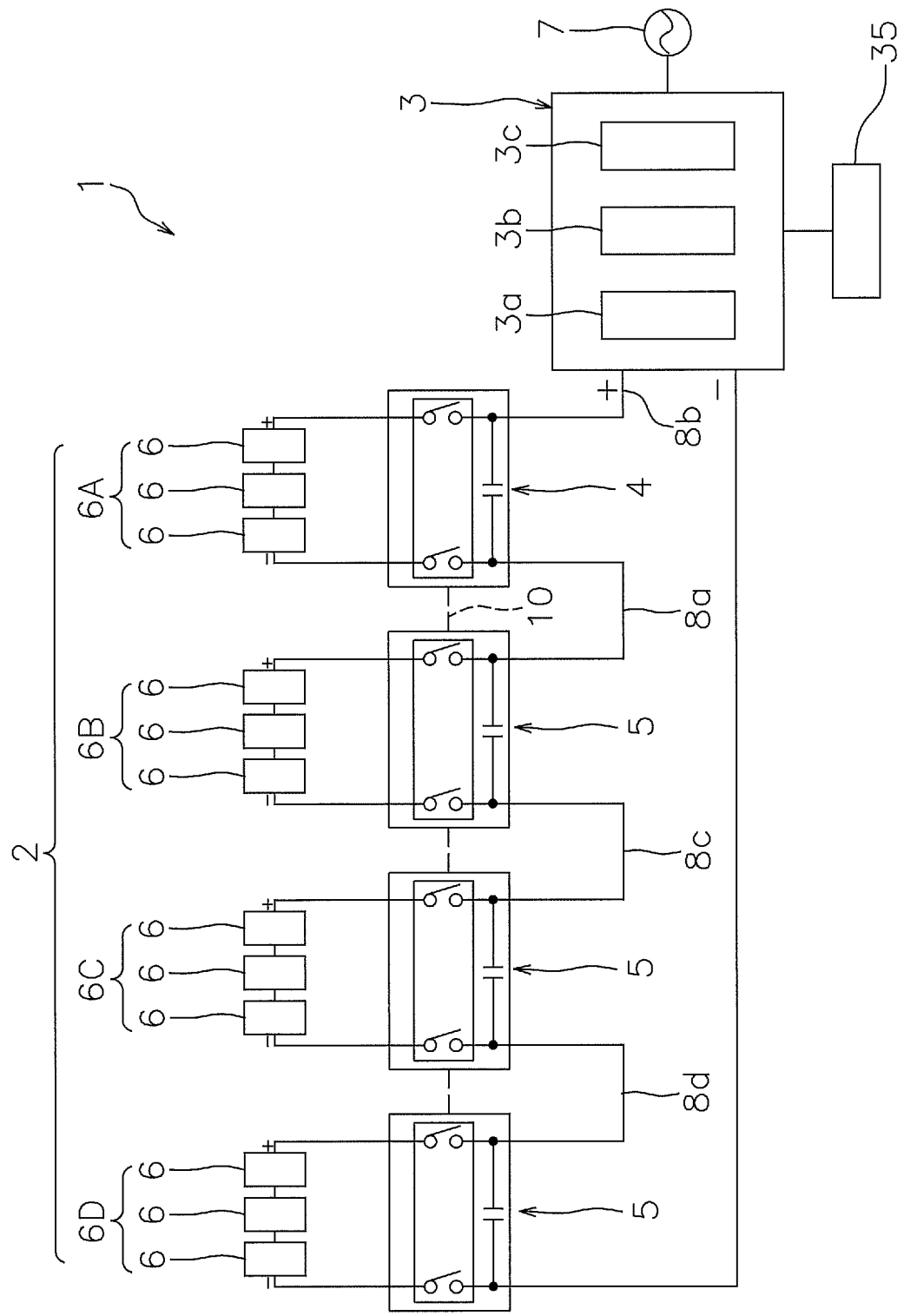
FIG. 10 is a block diagram schematically showing a configuration of a solar power generation system according to another embodiment.

Also, as shown in FIG. 10, the plurality of second shutoff devices 5 may be arranged individually to each of the plurality of solar cell module groups excluding the group (here, the group 6A) to which the first shutoff device 4 is connected.

Figure 11:
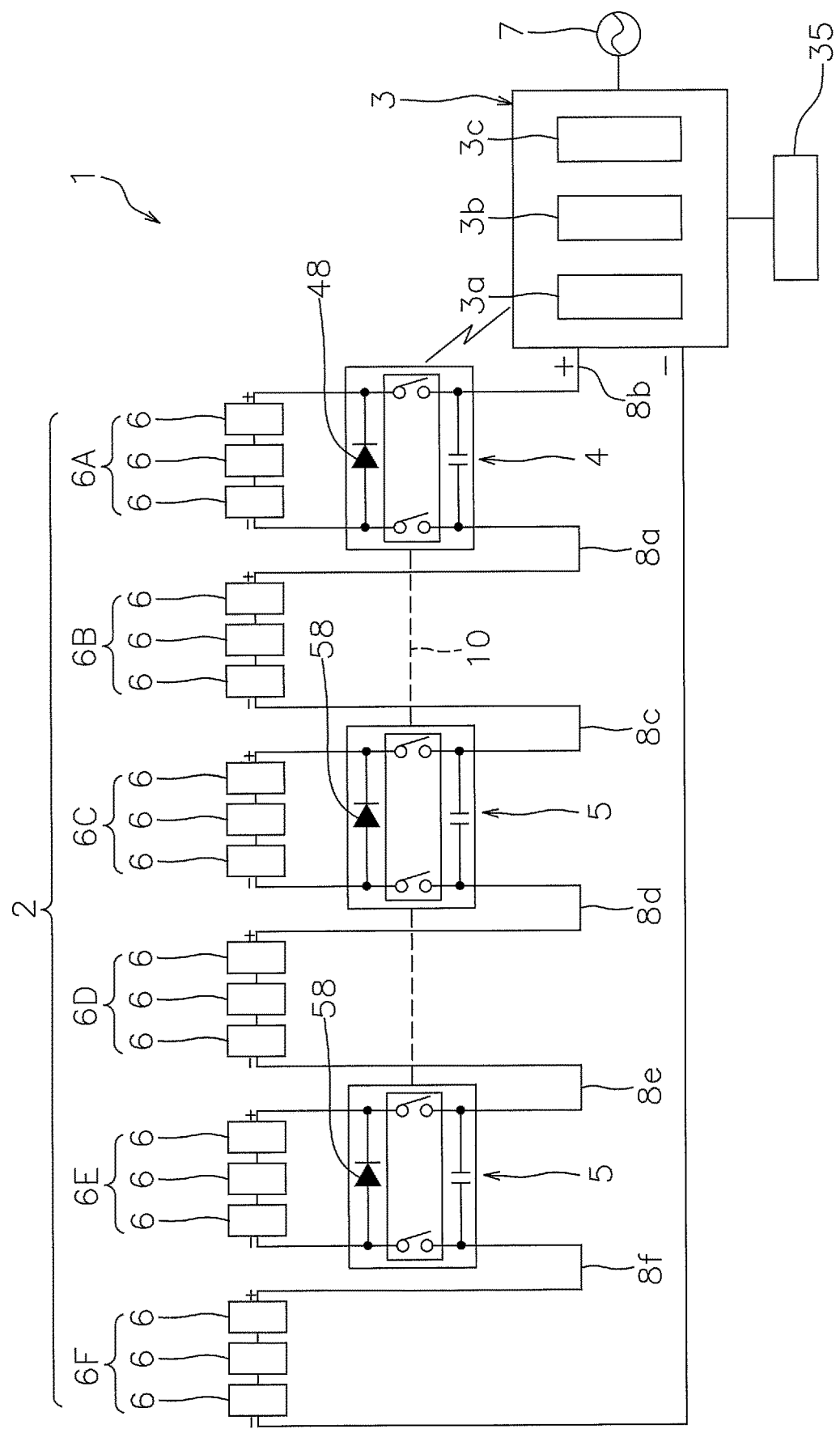
FIG. 11 is a block diagram schematically showing a configuration of a solar power generation system according to another embodiment.

As shown in FIG. 11, the first shutoff device 4 may include a bypass diode 48 connected in parallel with any one of the plurality of solar cell module groups. In the example shown in FIG. 11, the bypass diode 48 is electrically connected in parallel with the group 6A. The bypass diode 48 includes an anode connected to the cathode side terminal of group 6A and a cathode connected to the anode side terminal of group 6A. Similarly, the plurality of second shutoff devices 5 may include a bypass diode 58 connected in parallel with any one of the plurality of solar cell module groups. In the example shown in FIG. 11, the bypass diode 58 is electrically connected in parallel with each of groups 6C and 6E.

Figure 12:
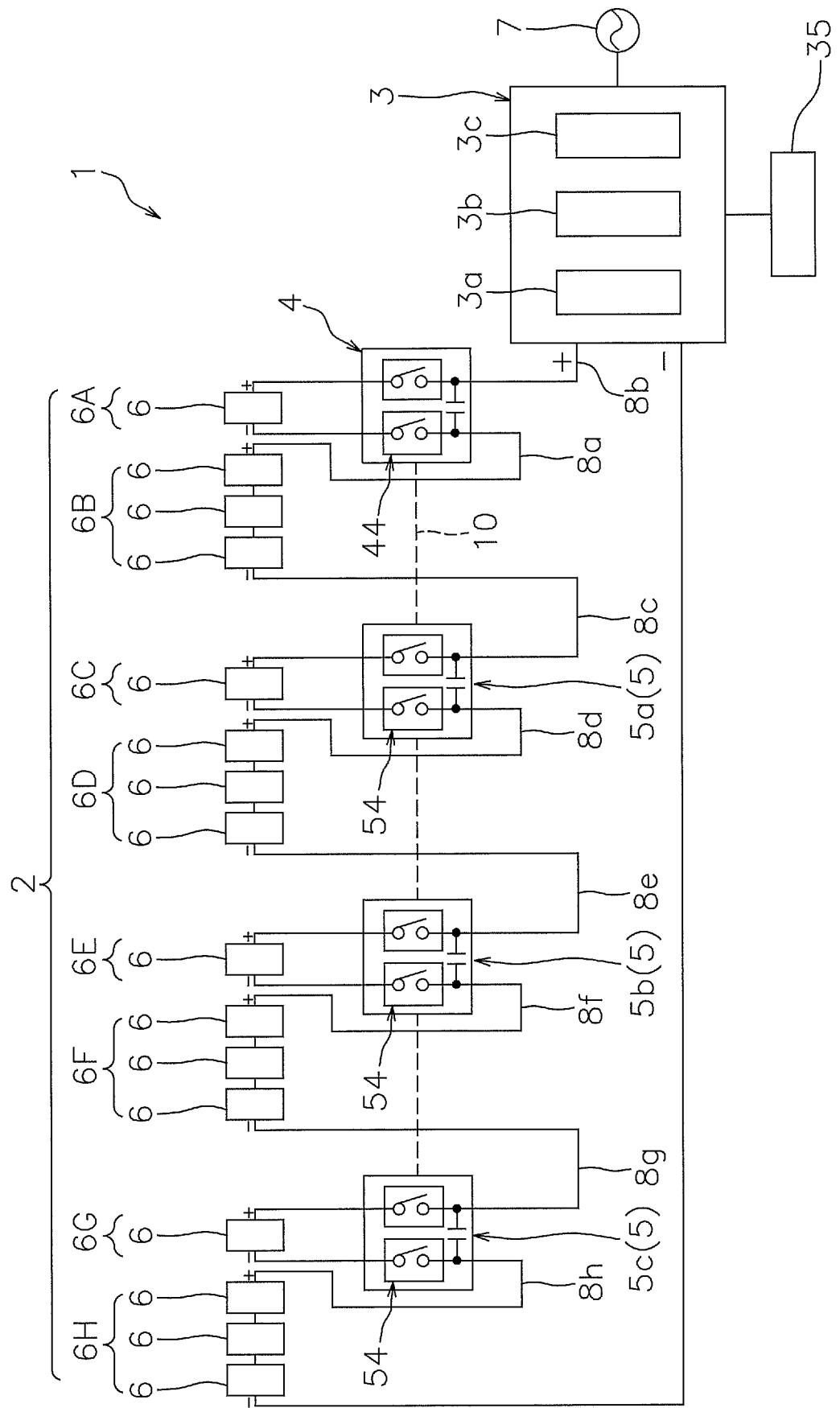
FIG. 12 is a block diagram schematically showing a configuration of a solar power generation system according to another embodiment.

In the above embodiment, the cutoff-connection unit 44 of the first shutoff device 4 has two contacts of the first switching unit 44a and the second switching unit 44b, but as shown in FIG. 12, the cutoff-connection unit 44 may be two relays having one contact. That is, the control unit 43 of the first shutoff device 4 may be configured to independently turn ON and OFF the first switching unit 44a and the second switching unit 44b. Similarly, as for the plurality of second shutoff devices 5, the control unit 53 may be configured to independently turn ON and OFF the third switching unit 54a and the fourth switching unit 54b of the cutoff-connection unit 54.

In the above embodiment, the first shutoff device 4 is connected to the electric path 8a connecting the group 6A and the group 6B and the electric path 8b connecting the inverter 3 and the group 6A, but the positions of the first shutoff device 4 and the plurality of second shutoff devices 5 may be exchanged. For example, the first shutoff device 4 may be connected to the electric path 8c and the electric path 8d, and the second shutoff device 5a may be connected to the electric path 8a and the electric path 8b.

Figure 8:
FIG. 8 is a diagram illustrating an example of operation modes of a shutoff device.
Figure 8:
Figure 8:
Figure 8:
Figure 8:

In the above embodiment, a first control signal is output to the first shutoff device 4 by power line communication, but as shown in FIG. 8, a first control signal may be output to the first shutoff device 4 by wireless communication such as Wi-Fi®. Alternatively, the inverter 3 and the first shutoff device 4 may be configured to communicate with each other by wireless communication.

According to the present invention, a solar power generation system is provided that achieves both decrease in installation cost of shutoff devices and improvement of safety of the solar power generation system.

1 Solar power generation system
2 String
3 Inverter
4 First shutoff device
5a-5C Second shutoff device
6 Solar cell modules
6A-6H Solar cell module group
44a First switching unit
44b Second switching unit
54a Third switching unit
54b Fourth switching unit
61 open and close unit
63 Semiconductor switching device
65 Another open and close unit

The invention claimed is:

1. A solar power generation system, comprising:
a string including a plurality of solar cell module groups connected in series, each of the solar cell module groups including one or more solar cell modules connected in series;
an inverter connected to the string and configured to convert DC power output from the string to AC power;
a first shutoff device connected to a first electric path that interconnects in series a first subset of the plurality of solar cell module groups, the first subset comprising one or more of said plurality of solar cell module groups included in the string; and
a second shutoff device connected to a second electric path that interconnects in series a second subset of the plurality of solar cell module groups, the second subset comprising one or more of said plurality of solar cell module groups included in the string other than the solar cell module groups included in the first subset,
wherein each of the solar cell module groups in the string has an open circuit voltage equal to or less than a predetermined open circuit voltage,
the first shutoff device cuts off connections between the solar cell module groups in the first subset in response to a first control signal from the inverter,
the second shutoff device cuts off connections between the solar cell module groups in the second subset in response to a second control signal output from the first shutoff device by a communication system different from power line communication, via a communication line that interconnects the first shutoff device and the second shutoff device,
the first shutoff device is driven by power generated by one or more of the solar cell modules in the first subset,
the first shutoff device includes a first switching unit connected to an anode side terminal of the first subset,
the first switching unit includes a first open and close unit and a first semiconductor switching device connected in parallel with the first open and close unit,
the first semiconductor switching device is turned ON before the first open and close unit is operated, and
the first switching unit includes a second open and close unit connected in series with the first semiconductor switching device.

2. The solar power generation system according to claim 1, wherein the first shutoff device outputs the second control signal to the second shutoff device after cutting off the connections between the plurality of solar cell module groups connected to the first electric path in response to the first control signal from the inverter.

3. The solar power generation system according to claim 1, wherein the open circuit voltage of each of the plurality of solar cell module groups in the string is 165 V or less.

4. The solar power generation system according to claim 1, wherein the inverter outputs the first control signal to the first shutoff device by power line communication.

5. The solar power generation system according to claim 1, wherein the inverter outputs the first control signal to the first shutoff device by wireless communication.

6. The solar power generation system according to claim 1, wherein at least one of the plurality of solar cell module groups in the string includes a plurality of solar cell modules connected in series.

7. The solar power generation system according to claim 1, wherein the first shutoff device includes a bypass diode connected in parallel with any one of the plurality of solar cell module groups.

8. The solar power generation system according to claim 1, wherein the second shutoff device includes a bypass diode connected in parallel with any one of the plurality of solar cell module groups.

9. A solar power generation system, comprising:
a string including a plurality of solar cell module groups connected in series, each of the solar cell module groups including one or more solar cell modules connected in series;
an inverter connected to the string and configured to convert DC power output from the string to AC power;
a first shutoff device connected to a first electric path that interconnects in series a first subset of the plurality of solar cell module groups, the first subset comprising one or more of said plurality of solar cell module groups included in the string; and
a second shutoff device connected to a second electric path that interconnects in series a second subset of the plurality of solar cell module groups, the second subset comprising one or more of said plurality of solar cell module groups included in the string other than the solar cell module groups included in the first subset,
wherein each of the solar cell module groups in the string has an open circuit voltage equal to or less than a predetermined open circuit voltage,
the first shutoff device cuts off connections between the solar cell module groups in the first subset in response to a first control signal from the inverter,
the second shutoff device cuts off connections between the solar cell module groups in the second subset in response to a second control signal from the first shutoff device by a communication system different from power line communication, via a communication line that interconnects the first shutoff device and the second shutoff device,
the first shutoff device is driven by power generated by one or more of the solar cell modules in the first subset,
the first shutoff device includes a first switching unit connected to an anode side terminal of the first subset,
the first switching unit includes a first open and close unit and a first semiconductor switching device connected in parallel with the first open and close unit,
the first semiconductor switching device is turned ON before the first open and close unit is operated,
the first shutoff device includes a second switching unit connected to a cathode side terminal of the first subset of the plurality of solar cell module groups,
the second switching unit includes a third open and close unit and a second semiconductor switching device connected in parallel with the third open and close unit, and
the second semiconductor switching device is turned ON before the third open and close unit is operated.

10. The solar power generation system according to claim 9, wherein the second switching unit includes a fourth open and close unit connected in series with the second semiconductor switching device.

11. The solar power generation system according to claim 9, wherein the first switching unit and the second switching unit are configured to be turned ON/OFF independently of each other.

12. A solar power generation system, comprising:
- a string including a plurality of solar cell module groups connected in series, each of the solar cell module groups including one or more solar cell modules connected in series;
- an inverter connected to the string and configured to convert DC power output from the string to AC power;
- a first shutoff device connected to a first electric path that interconnects in series a first subset of the plurality of solar cell module groups, the first subset comprising one or more of said plurality of solar cell module groups included in the string; and
- a second shutoff device connected to a second electric path that interconnects in series a second subset of the plurality of solar cell module groups, the second subset comprising one or more of said plurality of solar cell module groups included in the string other than the solar cell module groups included in the first subset,
- wherein each of the solar cell module groups in the string has an open circuit voltage equal to or less than a predetermined open circuit voltage,
- the first shutoff device cuts off connections between the solar cell module groups in the first subset in response to a first control signal from the inverter,
- the second shutoff device cuts off connections between the solar cell module groups in the second subset in response to a second control signal output from the first shutoff device by a communication system different from power line communication, via a communication line that interconnects the first shutoff device and the second shutoff device,
- the first shutoff device is driven by power generated by one or more of the solar cell modules in the first subset,
- the first shutoff device includes a first switching unit connected to an anode side terminal of the first subset,
- the first switching unit includes a first open and close unit and a first semiconductor switching device connected in parallel with the first open and close unit,
- the first semiconductor switching device is turned ON before the first open and close unit is operated,
- the second shutoff device is driven by power generated by one or a plurality of solar cell modules of the second subset,
- the second shutoff device includes a third switching unit connected to an anode side terminal of the second subset,
- the third switching unit includes a fifth open and close unit and a third semiconductor switching device connected in parallel with the fifth open and close unit,
- the third semiconductor switching device is turned ON before the fifth open and close unit is operated, and
- the third switching unit includes a sixth open and close unit connected in series with the third semiconductor switching device.

13. The solar power generation system according to claim 12, wherein the second shutoff device includes a fourth switching unit connected to a cathode side terminal of the second subset,
- the fourth switching unit includes a seventh open and close unit and a fourth semiconductor switching device connected in parallel with the seventh open and close unit, and
- the fourth semiconductor switching device is turned ON before the seventh open and close unit is operated.

14. The solar power generation system according to claim 13, wherein the fourth switching unit includes an eighth open and close unit connected in series with the fourth semiconductor switching device.

15. The solar power generation system according to claim 13, wherein the second shutoff device is configured such that the third switching unit and the fourth switching unit are turned ON/OFF independently of each other.

* * * * *